United States Patent

Lappin

[15] 3,636,779
[45] Jan. 25, 1972

[54] VALVE DRIVE MECHANISM

[72] Inventor: Richard J. Lappin, 442 Parkdale Blvd., Parchment, Mich. 49004

[22] Filed: Dec. 5, 1969

[21] Appl. No.: 882,506

[52] U.S. Cl. ..................................................74/89, 74/60
[51] Int. Cl. ............................................................F16h 33/00
[58] Field of Search ......................91/472; 418/49; 74/89, 60

[56] References Cited

UNITED STATES PATENTS

| 1,819,715 | 8/1931 | Bret | 74/60 |
| 3,183,848 | 5/1965 | Raymond | 74/60 |
| 2,723,596 | 11/1955 | Buchanan | 91/472 |
| 3,319,874 | 5/1967 | Welsh et al. | 74/60 |
| 3,356,080 | 12/1967 | Howard | 74/60 |

*Primary Examiner*—Milton Kaufman
*Assistant Examiner*—Wesley S. Ratliff, Jr.
*Attorney*—Stephen M. Mihaly

[57] ABSTRACT

Drive mechanism includes a rotatably mounted, canted cylindrical land on which is journaled a drive assembly retained against rotation but permitted to move in a longitudinal direction, whereby rotation of the cylindrical land causes a nutating or wobbling movement of the drive assembly which is transmitted to an output device through a suitable link connection.

16 Claims, 6 Drawing Figures

INVENTOR
RICHARD J. LAPPIN

BY Stephen M. Mihaly
ATTORNEY

INVENTOR.
RICHARD J. LAPPIN
BY
Stephen M. Mihaly
ATTORNEY

VALVE DRIVE MECHANISM

BACKGROUND OF THE INVENTION

This invention relates generally to a drive mechanism for converting angular or rotary motion to linear motion and vice versa, with maximum mechanical efficiency and essentially zero backlash. More specifically, this invention relates to a drive mechanism for driving a hydraulic valve by converting rotary motion of a set of control handles or the like into linear valve travel along an axis parallel to the axis of handle rotation, and may be used to control turret rotation of an ordnance vehicle.

Heretofore, the control of gun elevation and gun azimuth (turret rotation) of ordnance and like vehicles has ordinarily been accomplished through the use of hydraulic actuators whose movements are controlled by hydraulic valves coupled mechanically to a set of rotating handles, generally similar to the type found on aircraft. Tipping the handles fore and aft about a transverse elevation axis causes the gun to depress or elevate, whereas rotating the handles about a longitudinal "steering" axis causes the turret to rotate in a corresponding direction. The amount of angular input introduced at the handles determines the amount of valve opening and thus the velocity at which the gun moves in the desired direction.

Handle rotation about the elevation axis has been effectively converted to valve travel through conventional crank and drag link arrangements by providing close pin-to-link clearances which eliminate substantially all backlash. Upon release of the handles, centering springs applied directly to the valve promptly return the handle assembly to its null or neutral position.

In the azimuth axis, cam and follower mechanisms have ordinarily been used to convert handle rotation to valve movement. However, such mechanisms have been found to be objectionable particularly with regard to backlash at the control handles, since very low-cam angles are required to achieve the normally desired large angular displacements, and as a result, even a minute amount of cam-to-follower clearance will cause noticeable backlash or "play" at the control handles. The net result is a significant degradation in the operator's ability to control the gun around null and make accurate or fine adjustments which are necessary when attempting to lay the gun exactly on target.

The use of low-angle cams, with their apparent low back-drive efficiency, also often makes it difficult to bring the handles back to null using only the force available from the valve centering springs. Incorporating a "zero clearance" cam by using a preloaded follower or other similar device may minimize backlash but it will add substantial friction, thereby destroying much of the operator's "feel" of the system, and seriously degrade handle centering characteristics.

SUMMARY OF THE INVENTION

With the foregoing in mind, it is a principal object of this invention to provide an improved drive mechanism by which continuous and accurate control may be achieved.

Another object is to provide such a drive mechanism with excellent back-drive characteristics for returning the control handles to a neutral position upon release of the applied force.

A further object is to provide such a drive mechanism which effectively eliminates all backlash at the control handles.

A further object is to provide such a drive mechanism with novel adjusting means between a motion converter and valve comprised of an assembly of parts made to standard manufacturing tolerances which nevertheless has excellent null position accuracy and valve positioning accuracy.

Another object is to provide such a drive mechanism by which movements of the valve may be achieved with sufficient force to shear chips and other contaminants.

Yet another object is to provide such a drive mechanism which is relatively compact and inexpensive to manufacture.

These and other objects of the present invention may be achieved by providing a canted cylindrical land on a rotatable shaft of the drive mechanism on which is journaled a drive assembly. The drive assembly is retained against rotation but is permitted to move in a longitudinal direction, whereby rotation of the shaft and canted cylindrical land will cause a nutating or wobbling movement of the drive assembly. A semiflexible link connection between the drive assembly and an output device provides for axial movement of the output device in response to such nutating movements of the drive assembly, and a spring-centering mechanism may be used to return the output device to a neutral position upon release of the actuating force.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE PREFERRED EMBODIMENT

Figure 1:
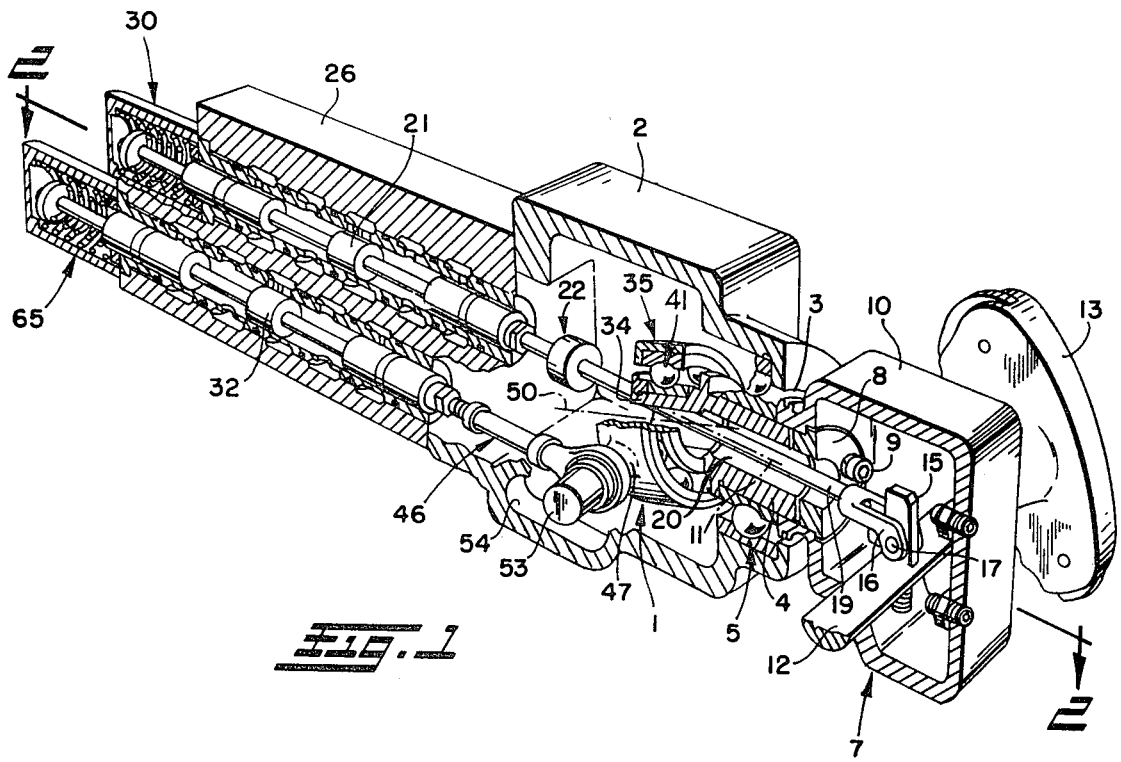
FIG. 1 is an isometric view of a preferred form of valve drive mechanism in accordance with this invention with portions broken away and sectioned to show certain details of construction.
Figure 2:
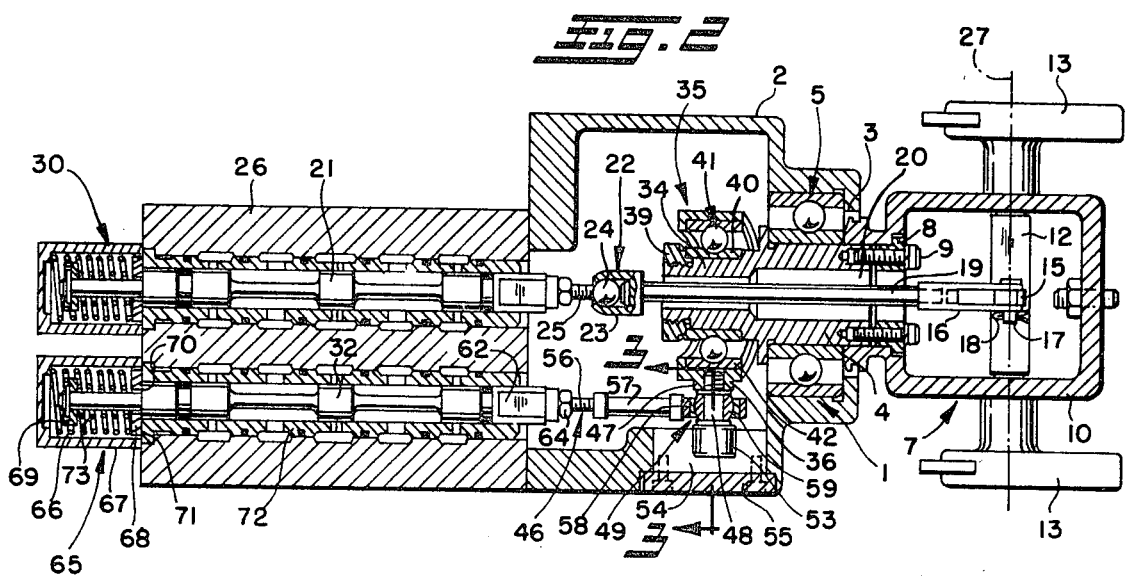
FIG. 2 is a longitudinal transverse section through the valve drive mechanism of FIG. 1, taken on the plane of the line 2—2, thereof.

Referring now in detail to the drawings, and first especially to FIGS. 1 and 2, there is shown a valve drive mechanism 1 in accordance with this invention comprising a housing 2 having an opening 3 in one end in which is journaled a rotatable shaft 4 as by means of ball bearings 5. The shaft 4 may be hollow as shown for a purpose to be subsequently explained, and has a control handle assembly 7 affixed to the outer end thereof using a lockwasher 8 and suitable fasteners 9.

Extending transversely through the control handle housing 10 perpendicular to the major axis 11 of the main drive shaft 4 is a rotatable crankshaft 12, the ends of which have mounted thereon a set of control handles 13. Intermediate the ends of the crankshaft 12 interiorly of the control handle housing 10 there is a projection 15 for pivotally mounting a clevis 16 thereto using a suitable pin 17 which is held in place by a cotter pin 18. A rod 19 having one end connected to the clevis 16 may extend through a central opening 20 in the main drive shaft 4 for connection to a valve plunger 21 contained in a manifold assembly 26 using a suitable linkage assembly 22 comprising a socket 23 and ball 24 having a link 25 projecting therefrom for threaded engagement with one end of the valve plunger 21.

Rotation of the control handles 13 about the axis 27 of the crankshaft 12 will obtain direct linear travel of the valve plunger 21, which may be used, for example, to raise and lower the gun of an ordnance vehicle or the like in known manner. By providing close pin-to-link clearances between the various parts, substantially all backlash at the control handles 13 may be eliminated to permit fine adjustments in gun elevation. A spring-centering mechanism 30 may be provided for returning the valve plunger 21 to a null or neutral position upon release of the turning force applied to the control handles.

A second valve plunger 32 is also contained in the manifold assembly 26 which may be reciprocated to obtain turret rotation of an ordnance vehicle through rotation of the main drive shaft 4 about the major axis 11 in a manner to be subsequently fully described. As clearly shown in FIGS. 1 and 2 and also in FIGS. 4–6, the shaft 4 has a canted cylindrical land 34 on the inner end thereof for receipt of a drive assembly 35 having a sleeve 36 bearing-mounted on the canted cylindrical land 34. A locknut 39 threaded onto the outer end of the cylindrical land 34 retains the inner race 40 of bearing 41 for rotation with shaft 4, but the outer race 42 and sleeve 36 are free to rotate with respect to shaft 4. Sleeve 36 is press fitted onto the outer race 42 in conventional manner, and has a radially extending threaded boss 47 adapted to threadedly receive the guide shaft 48 of a guide roll assembly 49.

Figure 4:
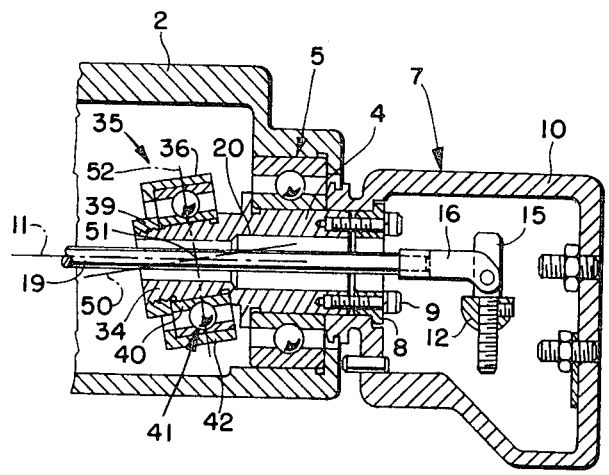
FIG. 4 is an enlarged longitudinal vertical section through the handle and drive assembly of FIG. 1.

The cylindrical land 34 is so positioned that its centerline of symmetry 50 forms a common trisection 51 with the shaft major axis 11 and the central plane 52 of drive assembly 35 (see FIG. 4). The central plane 52 of the drive assembly 35 also coincides with the central plane of ball bearing 41 and with the centerline of guide assembly 49.

Figure 3:
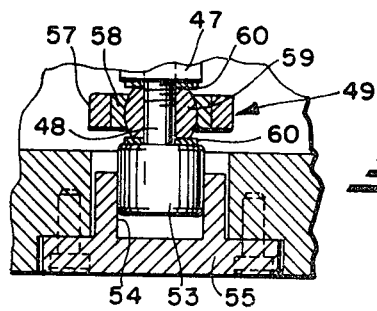
FIG. 3 is an enlarged fragmentary sectional view through the roller assembly and roller guide of FIG. 2, taken on the plane of the line 3—3.
Figure 5:
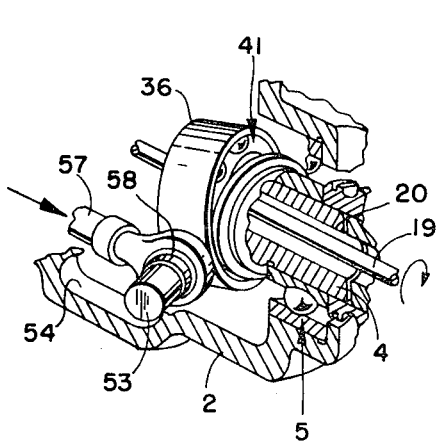
FIGS. 5 and 6 are enlarged fragmentary sections through the drive assembly and roller guide of FIG. 1 showing the extreme end positions of the roller assembly obtained by rotation of the drive shaft for effecting longitudinal movements of the valve plunger associated therewith in opposite directions.
Figure 6:
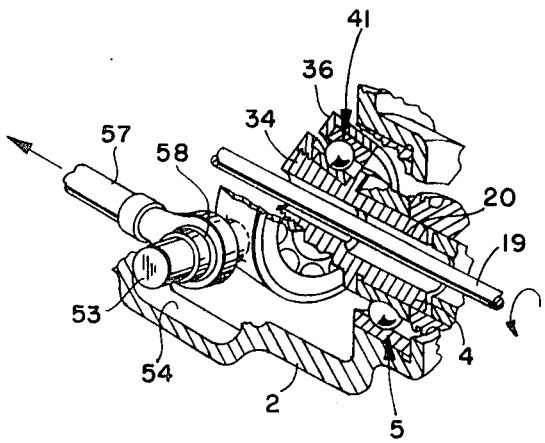

As best seen in FIGS. 2 and 3, the shaft 48 of guide roll assembly 49 has a roller 53 journaled on its outer end which is received in a slot 54 in a guide member 55 securely attached to housing 2. The slot 54 extends in a direction parallel to the major axis 11 of shaft 4, whereby the roller 53 is free to move in the slot 54 but is constrained against movement in any other direction. Accordingly, when the shaft 4 is rotated about its own axis in response to a command input applied by turning the control handle assembly 7 about the major axis 11, the canted cylindrical land 34, being an integral part of shaft 4, will rotate with a wobbling motion about the major axis 11. This causes the drive assembly 35 to move in a nutating manner, driving guide roller 53 through a short arc of travel along slot 54, the direction of travel depending upon the direction of input motion applied at the control handle assembly as illustrated in FIGS. 5 and 6. The arc of travel of the guide assembly 49 lies in a plane passing through the major axis 11 and has its center at the common trisection point 51.

Such arcuate movement of the guide roll assembly 49 is transferred directly to the valve plunger 32 through a link 46 comprising a threaded rigid portion 56 and a semiflexible portion 57 having a spherical bearing 58 engaged by a ball 59 on the shaft 48 radially inwardly of the roller 53. Spacers 60 on opposite sides of ball 59 permit spherical bearing 58 to rotate about the ball 59 without contacting the sleeve 36.

The rigid portion 56 of link 46 may be threaded for connection to the valve plunger 32, and wrench flats 62 may be provided on valve plunger 32 to facilitate assembly and adjustment, thus making it possible to use an assembly of parts made to standard manufacturing tolerances without losing either null position accuracy or valve position accuracy. A locknut 64 on the threaded rigid portion 56 may be tightened to lock the link 46 in adjusted position.

A spring-centering mechanism 65 identical to spring-centering mechanism 30 normally maintains the valve plunger 32 in a neutral or hydraulic null position for the valve by action of the springs 66 and 73 through retainer 67 and centering washers 68 and 69 to force shoulder 70 of valve plunger 32 into exact alignment with the face 71 of valve sleeve 72. However, the force of the spring-centering mechanism 65 is relatively light and readily overcome upon application of a turning torque to the control handle assembly 7 to rotate the shaft 4 about its major axis 11 and cause axial movement of the valve plunger 32 for metering hydraulic flow to the turret rotation actuator (not shown). When the applied torque is released, the valve-centering spring mechanism 65 again takes command, causing the valve plunger 32 to move to the null position, shutting off hydraulic flow and returning the control handles 7 to center.

During such valve movements, any discernible backlash or play between the control handles 7 and valve plunger 32 motion is completely eliminated by the drive assembly 35 which is rigidly mounted to the shaft 4, and the drive bearing 41, roller 53, and spherical bearing 58 are lightly preloaded to remove all internal clearance. Running clearance between the roller 53 and walls of slot 54 are desirably in the order of 0.001 to 0.002 inch, which may be held with relative ease in normal machining operation, and yet this results in less than 2 minutes of play in handle motion, which is far beyond the ability of the operator to discern any motion. Moreover, the small amount of rise and fall which occurs at bearing 58 due to the arc of travel of shaft 48 about trisection point 51 is accommodated by slight deflection of the semiflexible portion 57 of link 55, preventing detrimental side loads from acting on the valve plunger 32.

From the foregoing, it can now be seen that the drive mechanism of the present invention is of relatively simple construction and yet substantially eliminates all backlash at the control handles. This is a particularly important factor when using the mechanism for controlling gun position, since a significant amount of backlash will destroy the ability of the gunner to lay the sight accurately on a small target. Backlash is also a major degrading factor in attaining the extremely small valve errors required for low-tracking speeds.

The drive mechanism is also very compact and extremely stiff, providing the ability to overdrive the valve to shear chips and other contamination should the need arise. Since backlash has been eliminated without degrading mechanical stiffness of the system, response of the valve to handle input rotation is also immediate and accurate. Valve displacement to handle rotation ratio or gain may also be varied over a wide range by merely changing the angle at which the canted cylindrical land intersects the major axis of the shaft; or by adjusting the distance from the centerline of the drive assembly to the centerline of spherical bearing 58.

The mechanism also exhibits very good linearity between axial valve displacement and input handle rotation over a wide range of handle displacements, and has excellent back-drive capabilities which forces the control handles to a neutral position once the operator's controlling force has been removed and provides excellent feel characteristics for the operator. Such back-drive capabilities also permit a relatively weak spring-centering mechanism to be used which does not require much effort to be overcome by the operator when manual inputs are applied to the handles. Moreover, with the exception of the main drive shaft 4 and sleeve 36, standard mechanical components may be used in the device.

Although the particular disclosed embodiment of drive mechanism is described for use in controlling movements of an ordnance vehicle, it will be apparent that the same principles may be applied to a great variety of mechanical drives and positioning devices. Similarly, although the disclosed embodiment is designed to operate as an open-loop device, suitable feedback means may be added if desired, to make the device operate as a closed loop servosystem without departing from the principles of the invention.

I, therefore, particularly point out and distinctly claim as my invention:

1. A drive mechanism for converting rotary motion to linear motion and vice versa comprising a rotatably mounted shaft having a canted cylindrical land thereon for rotation with said shaft, a drive assembly journaled on said cylindrical land for relative rotation, a guide assembly extending radially outwardly from said drive assembly, means for limiting movement of said guide assembly in an arcuate path generally parallel to the longitudinal axis of said shaft, whereby rotation of said shaft and canted cylindrical land causes a nutating movement of said drive assembly and arcuate movement of said guide assembly, and means for converting such arcuate movement of said guide assembly to linear movement, said drive assembly comprising a sleeve bearing-mounted on said cylindrical land, and said guide assembly including a guide shaft extending radially outwardly from said sleeve, said means for limiting movement of said guide assembly in an arcuate path comprising a fixed guide member having a slot therein extending in a direction parallel to the longitudinal axis of said shaft, and a roller on said guide shaft received in said slot, said means for converting arcuate movement of said guide assembly to linear movement comprising a link having a spherical bearing engaged by a ball on said guide shaft.

2. The drive mechanism of claim 1 wherein said sleeve bearing, guide roller, and spherical bearing are lightly preloaded to remove internal clearances.

3. The drive mechanism of claim 1 wherein said link includes a rigid portion for connection to a linear output device, and a semiflexible portion which accommodates the rise and fall at spherical bearing during such arcuate movement by slight deflection thereof.

4. The drive mechanism of claim 3 wherein said output device is a valve plunger, and said rigid portion of said link has a threaded connection with said valve plunger to facilitate assembly and adjustment.

5. The drive mechanism of claim 4 further comprising a spring-centering mechanism for urging said valve plunger to neutral position, the force of said spring-centering mechanism being relatively light and readily overcome upon application of a turning torque to said shaft.

6. The drive mechanism of claim 1 wherein the centerline of symmetry of said cylindrical land forms a common trisection point with the longitudinal axis of said shaft and the central plane of said drive assembly.

7. The drive mechanism of claim 6 wherein the central plane of said drive assembly coincides with the central plane of said sleeve bearing and the centerline of said guide assembly.

8. The drive mechanism of claim 6 wherein the arc of travel of said guide assembly lies in a plane passing through the longitudinal axis of said shaft and has its center at the common trisection point.

9. The drive mechanism of claim 1 wherein said link includes a rigid portion for connection to a linear output device, and means for adjusting the length of said rigid portion for adjusting the neutral position of such linear output device.

10. The drive mechanism of claim 1 wherein said ball is mounted on said guide shaft radially inwardly of said roller.

11. The drive mechanism of claim 10 further comprising spacer means on said guide shaft on opposite sides of said ball for permitting said spherical bearing to rotate about said ball without contacting said sleeve.

12. A drive mechanism for converting rotary motion to linear motion and vice versa comprising a rotatably mounted shaft having a canted cylindrical land thereon for rotation with said shaft, a drive assembly journaled on said cylindrical land for relative rotation, a guide assembly extending radially outwardly from said drive assembly, means for limiting movement of said guide assembly in an arcuate path generally parallel to the longitudinal axis of said shaft, whereby rotation of said shaft and canted cylindrical land causes a nutating movement of said drive assembly and arcuate movement of said guide assembly, means for converting such arcuate movement of said guide assembly to linear movement, and a control handle assembly affixed to said shaft for rotating said shaft, said control handle assembly including a housing, a second shaft extending transversely through said housing and mounted for rotation about the axis of said second shaft, control handles on the outer ends of said second shaft, a rod extending through a central opening in said shaft, and means connecting said rod to said second shaft for reciprocating said rod during rotation of said second shaft by rotation of said control handles.

13. The drive mechanism of claim 12 wherein said means connecting said rod to said second shaft comprises a projection on said second shaft intermediate the ends thereof, and a clevis pivotally mounted to said projection, said rod being connected to said clevis.

14. A drive mechanism for converting rotary motion of a shaft to linear movement of a valve plunger comprising a housing, a shaft journaled in said housing for rotation, said shaft having a canted cylindrical land thereon for rotation with said shaft, a drive assembly comprising a sleeve journaled on said cylindrical land for relative rotation, a guide assembly attached to said sleeve and extending radially therefrom, means for limiting movement of said guide assembly in an arcuate path parallel to the longitudinal axis of said shaft, whereby rotation of said shaft and canted cylindrical land causes a nutating movement of said drive assembly and arcuate movement of said guide assembly, a valve plunger, means mounting said valve plunger for linear movement, means for converting such arcuate movement of said guide assembly to linear movement of said valve plunger, and a spring-centering mechanism for returning said valve plunger and thus said drive assembly to a neutral position when there is no turning force applied to said shaft.

15. The drive mechanism of claim 14 wherein said means for converting arcuate movement of said guide assembly to linear movement of said valve plunger comprises a link interconnecting said valve plunger and guide assembly, and means for adjusting the length of said link for adjusting the neutral position of said valve plunger.

16. The drive mechanism of claim 14 wherein said means for converting arcuate movement of said guide assembly to linear movement of said valve plunger comprises a link interconnecting said valve plunger and guide assembly, said link including a rigid portion for connection to said valve plunger, and a semiflexible portion which accommodates such arcuate movement of said guide assembly.

* * * * *